Patented Nov. 3, 1942

2,300,780

UNITED STATES PATENT OFFICE 2,300,780

SULPHATED OIL COMPOSITION

George W. Fiero, Buffalo, N. Y.

No Drawing. Application August 23, 1939,
Serial No. 291,498

12 Claims. (Cl. 260—400)

This invention relates to sulphated products, more particularly to solid sulphated oils, and to a process for preparing the same. This invention also relates to ointments and salves prepared from said sulphated products.

In the manufacture of ointments, salves and the like it is highly advantageous to employ water-dispersible materials as the bases of these products, since it has been found such products when prepared from bases that are not dispersible in water tend to interfere with the normal evaporation of moisture from the skin upon application thereto, so that normal healing of sores, abrasions and the like to which such products are applied tends to be somewhat retarded. Such skin preparations should also have pH values substantially the same as that of the skin, i. e., about 6.0, since it has been found that the skins of certain people tend to become badly irritated by the application thereto of alkaline materials. It is known that certain sulphated oils and fats such sulphated castor oil, sulphated neat's-foot oil, etc. are water-dispersible and may be prepared so as to have pH values substantially the same as that of the skin. However, such sulphated oils and fats are liquids so that they may not be advantageously employed to manufacture ointments, salves and the like. Actually the only sulphated oil or fat commercially available which is a solid is sulphated tallow, and this product has such a low water dispersibility that it cannot be successfully used in the production of skin preparations of the desired type. Recently there has been a great demand in the industry for a water-dispersible sulphated oil or fat which may contain up to about 30% or more moisture at a pH value as low as about 5.5 without becoming fluid at temperatures of about 25° C.; however, as yet no sulphated material has been manufactured which satisfies these requirements.

It is the object of this invention to provide novel sulphated oils which are solid at room temperature, i. e., between about 20° C. and about 25° C.

Another object of this invention is to provide a water-dispersible sulphated oil which may contain up to at least about 30% moisture at a pH value as low as about 5.5 without becoming fluid at a temperature of about 25° C.

It is a further object of this invention to provide a process for the preparation of ointments, salves and the like.

I have found that sulphated oils which are substantially solid at room temperature may be obtained by sulphating hydrogenated castor oil having an iodine value less than about 11. The solid sulphated oils thus produced have iodine values less than about 11, the particular iodine value being approximately equivalent to that of the hydrogenated castor oil which was sulphated. The products of my invention may contain up to at least about 30% moisture at a pH value as low as about 5.5 without becoming fluid at room temperatures of about 25° C. The preferred products of my invention are prepared by sulphating hydrogenated castor oil having an iodine value less than about 4; these products may contain as much as 50% moisture at a pH value as low as about 5.5 without becoming fluid at temperatures of about 25° C. The products of my invention may, if desired, have pH values substantially above about 5.5; for example, the pH values of my novel products may range from about 5.5 to about 9.5; preferably, however, the products of my invention are prepared so as to have a pH value of about 6. These products are readily dispersible in water and are capable of a wide variety of uses; they may be employed to particular advantage in the preparation of ointments, salves and the like.

The products of my invention may be prepared by sulphating in any suitable manner hydrogenated castor oil having an iodine value less than about 11 and preferably less than about 4. The hydrogenated castor oil may be obtained by subjecting castor oil to a hydrogenation treatment and is a solid usually having a melting point of about 75° C. or over. The sulphation step is preferably carried out by gradually adding approximately 100 parts of the hydrogenated castor oil in either a solid or molten condition to between about 25 and about 200 parts, preferably about 100 parts, of concentrated sulphuric acid chilled with ice to a low temperature. The mixture is then preferably agitated at a temperature between about 0° C. and about 40° C., preferably between about 25° C. and about 30° C., until the mass becomes homogeneous which may require about one hour. The sulphated mass may then be washed with an amount of an aqueous solution equivalent to approximately two to four or more times the quantity of the hydrogenated castor oil sulphated; the wash solution employed is preferably an aqueous sodium chloride solution containing sufficient amounts of an alkaline material to neutralize the sulphated mass to a pH value of about 5. After the sulphated mass has been thoroughly washed with the aqueous solution, the mass is permitted to settle and the aqueous layer which separates withdrawn. However, if desired, the sulphated mass may be washed with a solution containing substantially no alkaline material, the aqueous layer which separates upon settling withdrawn, and the washed sulphated mass then neutralized. The alkaline material with which the sulphated mass is neutralized may be any suitable alkaline substance such as, for example, sodium or potassium carbonate, sodium or potassium hydroxide, ammonium hydroxide, calcium hydroxide, or alkaline amines such as triethanolamine, tri-isopropanolamine and the like.

The sulphated mass neutralized to a pH value of about 5 in accordance with the preferred method above described may then be treated to adjust its pH value to the desired point. The sulphated product may be finished to a pH value of from about 5.5 to about 9.5, but preferably the pH value of the sulphated mass is adjusted to between about 5.5 and about 7, e. g., about 6.0. The moisture content of the sulphated mass may also be adjusted at this point if necessary. The percentage of moisture present in the mass after washing and neutralization may vary considerably but generally lies between about 20% and about 30% of the mass; therefore, if it is desired to produce a finished product having a moisture content within this range, it may be that no adjustment of the moisture content of the sulphated mass would be required. Whether or not an adjustment of the moisture content is necessary depends upon the amount of water present in the sulphated mass and upon the amount it is desired to include in the finished product; for example, if hydrogenated castor oil having an iodine value of about 8 is sulphated, the moisture content of the finished product may be about 30% without the product becoming fluid at temperatures of about 25° C., whereas if the hydrogenated castor oil had a lower iodine value, e. g., less than about 4, the moisture content of the finished product may be as high as about 50%. It is a relatively simple matter, once the percentage of moisture in the sulphated mass is determined, to adjust the moisture content of the final product to the desired value in accordance with the above factors.

The preferred process hereinabove described may be varied to some extent without departing from the scope of my invention. The reaction of the hydrogenated castor oil with the sulphuric acid may be carried out in any other desirable manner; for example, the hydrogenated castor oil may be dissolved in a solvent such as ethylene dichloride, sulphuric acid added thereto and the ingredients permitted to react to produce the sulphated product. Other sulphating agents known to the art may be used if desired. The composition of the wash solution may vary widely so long as the removal of unreacted sulphating agent is suitably effected. The sulphated mass may be neutralized directly to the desired pH value, thus avoiding the final adjusting step. Other variations in the above process may also be made without substantially altering the character of the final product.

The products of my invention are water-dispersible solids or pastes. Their color may vary from a white color to a light-brown and they have a pleasant odor and unctuous feel. These products may be employed to great advantage as bases in the manufacture of ointments, salves and the like. For example, therapeutic materials such as salicylic acid, mercury compounds and the like may be mixed with these products to produce ointments or salves highly suitable for application to sores, wounds, rashes and other skin afflictions, since these ointments and salves possess therapeutic activity but do not interfere with the normal evaporation of the moisture from the skin affliction. If desired, the products of my invention may be mixed with standard ointment bases such as lanolin, and the mixture then processed in the known manner to form ointments, salves and the like, whereby the desirable water-dispersibility of the products of my invention is imparted to the ointments or salves obtained. Ointments and salves prepared from the products of my invention are distinctly superior to those now on the market prepared from standard ointment bases such as lanolin, since, as above pointed out, their water-dispersibility tends to accelerate the healing of the skin affliction to which the ointment or salve is applied.

My novel products may also be employed in a variety of other manners. For example, the solid sulphated oils of my invention have been found to be highly suitable for use in paper coating compositions and for treating fibrous materials such as textiles or leather. These products may be employed as lubricants and coolants in the metal coating and metal working industries; they make particularly effective wire drawing compounds. My novel products also are useful for breaking petroleum emulsions and as defoamers, plasticizers, wetting, cleansing, softening and lubricating agents; in connection with their cleansing action, I have found they may be used to great advantage in the manufacture of cake soaps. These products may also be used as emulsifying agents, particularly in the manufacture of solid cosmetic materials such as cold creams, vanishing creams and the like. For example, a homogeneous cold cream may be prepared by mixing a dilute aqueous solution of a sodium salt sulphated hydrogenated castor oil with a molten mixture of a white wax and a heavy liquid petrolatum and permitting the mass to cool and harden; the presence of one of the water-dispersible sulphated products of my invention in this cream not only assists in the production of a homogeneous cream but also permits the cream to be readily washed off the skin with water. Creams thus prepared remain stable indefinitely. Vanishing creams may also be prepared utilizing the products of my invention, for example, by adding a dilute solution of a sodium salt of sulphated hydrogenated castor oil to molten stearic acid and permitting the mixture to cool and set. My products may be incorporated in hair waving preparations with advantage since I have found that their presence in such preparations increases the penetrating power thereof, improves the wave in the hair, causes the preparations to dry faster and prevents them from running. They may also be employed to coat pigments to render the pigments water or oil dispersible. Highly sulphated products of my invention find use in the preparation of quick setting cements. It should be noted that when my novel products are applied to cosmetic uses their pH values should be about 6, whereas if these products are employed for some of the other uses indicated above, e. g., as cleansing or wetting agents, their pH values may advantageously be above about 6, e. g., 7 or more. From the properties of my novel products it will be apparent that they are capable of a wide variety of other uses.

The following examples are illustrative of my invention. Amounts are given in parts by weight.

*Example I*

100 parts of hydrogenated castor oil having an iodine value of about 2.7 were melted and gradually introduced with agitation into 100 parts of 98% sulphuric acid chilled with ice. The mixture was then agitated for about one hour, the temperature being permitted to rise from below 20° C. to about 30° C. at the end of the reaction. The sulphation mass was dropped into a solution containing 50 parts of sodium chloride and 300 parts of sodium carbonate dissolved in about 400 parts of water thoroughly chilled with ice and stirred vigorously, the temperature of the mass being maintained below 25° C. The aqueous mass was then permitted to stand overnight at a temperature between about 45° C. and about 50° C., whereupon an aqueous layer separated and was withdrawn. The resulting product was finished by adjusting its pH value with soda to about 6.0 and its moisture content to about 40%. The finished product was a solid which did not flow at a temperature of about 25° C.

*Example II*

100 parts of finely ground hydrogenated castor oil having an iodine value of about 4 were gradually added with agitation to 100 parts of 98% sulphuric acid chilled with ice. The mixture was agitated for about one hour, the temperature being permitted to rise from below 20° C. to about 30° C. at the end of the reaction. The sulphation mass was dropped into a solution containing about 50 parts of sodium chloride dissolved in about 400 parts of water thoroughly chilled with ice and stirred vigorously, the temperature of the mass being maintained below 25° C. The aqueous mass was then permitted to stand overnight at a temperature between about 45° C. and about 50° C., whereupon a water layer separated and was withdrawn. The washed mass was then neutralized with soda to a pH value of about 6.0 and the water content was adjusted to about 30%. The finished product was a solid material which did not flow at a temperature of about 25° C.

*Example III*

100 parts of hydrogenated castor oil having an iodine value of about 8 were melted and gradually introduced with agitation into 100 parts of 98% sulphuric acid chilled with ice. The mixture was then agitated for about one hour, the temperature being permitted to rise from below 20° C. to about 30° C. at the end of the reaction. The sulphation mass was dropped into a solution containing 50 parts of sodium chloride and 300 parts of sodium carbonate dissolved in about 400 parts of water thoroughly chilled with ice and stirred vigorously, the temperature of the mass being maintained below 25° C. The aqueous mass was then permitted to stand overnight at a temperature between about 45° C. and about 50° C., whereupon an aqueous layer separated and was withdrawn. The resulting product was finished by adjusting its pH value with soda to about 6.0 and its moisture content to about 30%. The finished product was a solid which did not flow at a temperature of about 25° C.

*Example IV*

100 parts of hydrogenated castor oil having an iodine value of 11 were dissolved in 300 parts of ethylene dichloride and the solution chilled with ice. 100 parts of 98% sulphuric acid were then added to the chilled solution, and the mixture agitated for about one hour. The sulphation mass was then dropped into a solution containing 50 parts of sodium chloride and 300 parts of sodium carbonate dissolved in about 400 parts of water thoroughly chilled with ice and stirred vigorously, the temperature of the mass being maintained below 25° C. The ethylene dichloride layer which separated from the aqueous layer was withdrawn, the solvent evaporated therefrom and the product finished by adjusting its pH value with soda to about 6.0 and its moisture content to about 30%. This product was a solid which did not flow at a temperature of about 25° C.

From the above description it will be evident that my invention provides products having highly novel and valuable properties, which are particularly useful in the manufacture of ointments and salves. The use of ointments and salves prepared from the products of my invention has clearly demonstrated the superiority of these preparations over ointments and salves heretofore prepared, which contained no water-dispersible material. From the above description it will also be apparent that the products of my invention, because of their unique properties, may be used to advantage in a great many other ways. Therefore my invention will be of great interest to those engaged in the manufacture of water-dispersible organic products.

In view of the well known physical and chemical similarities existing between sulphated oils and the corresponding phosphated oils, my invention is also intended to cover phosphated hydrogenated castor oil having an iodine value less than about 11 and the production thereof by the methods hereinabove described.

The terms "sulphated" and "phosphated" are used throughout the specification and claims to denote not only the unneutralized esters obtained by reacting hydrogenated castor oil with sulphating or phosphating agents, but also the neutralized products obtained therefrom.

Since certain changes may be made in the above products and different embodiments of the invention could be made without departing from the scope thereof, it is intended that all matter contained in the above description shall be interpreted as illustrative and not in a limiting sense.

This application is a continuation-in-part of application Serial No. 134,089, filed March 31, 1937.

Having described my invention, what I claim as new and desire to secure by Letters Patent, is:

1. A composition of matter consisting essentially of a substance selected from the group consisting of sulphated hydrogenated castor oil and phosphated hydrogenated castor oil having an iodine value less than 11.

2. Sulphated hydrogenated castor oil having an iodine value less than 4.

3. Sulphated hydrogenated castor oil having an iodine value less than 11 and a pH value not less than 5.5.

4. Sulphated hydrogenated castor oil having an iodine value less than 4 and a pH value of not less than 5.5.

5. Sulphated hydrogenated castor oil having an iodine value less than 11, a pH value not less than 5.5 and a moisture content up to at least 30%, said product being substantially solid at temperatures of about 25° C.

6. Sulphated hydrogenated castor oil having an iodine value of less than 4, a pH value not less than about 5.5 and a moisture content not substantially greater than 50%, said product being substantially solid at temperatures of 25° C.

7. A process of preparing a water-dispersible oil selected from the group consisting of sulphated and phosphated oils and which may contain up to at least 30% moisture at a pH value not less than 5.5 without becoming fluid at temperatures of about 25° C., which comprises subjecting hydrogenated castor oil having an iodine value less than 11 to the action of an agent selected from the group consisting of sulphating and phosphating agents.

8. A process of preparing a water-dispersible sulphated oil which may contain up to at least 30% moisture at a pH value not less than 5.5 without becoming fluid at temperatures of about 25° C., which comprises subjecting hydrogenated castor oil having an iodine value less than 4 to the action of a sulphating agent.

9. A process of preparing a water-dispersible sulphated oil which may contain up to at least 30% moisture at a pH value not less than 5.5 without becoming fluid at temperatures of about 25° C., which comprises subjecting hydrogenated castor oil having an iodine value less than 11 to the action of a sulphating agent, and neutralizing the sulphated mass to produce a product having a pH value between 5.5 and 9.5.

10. A process of preparing a water-dispersible sulphated oil which may contain up to at least 30% moisture at a pH value not less than 5.5 without becoming fluid at temperatures of about 25° C., which comprises subjecting hydrogenated castor oil having an iodine value less than 11 to the action of a sulphating agent, and treating the sulphated mass so as to produce a product having a pH value between 5.5 and 9.5 and a moisture content up to at least about 30%.

11. A process of preparing a water-dispersible sulphated oil which may contain up to at least 30% moisture at a pH value of not less than 5.5 without becoming fluid at temperatures of about 25° C., which comprises adding hydrogenated castor oil having an iodine value less than 4 to concentrated sulphuric acid, permitting the substances to react, removing excess sulphating agent, neutralizing the sulphated mass to a pH value of 6 and adjusting the moisture content of the sulphated mass to a value between 30% and 50%.

12. A substantially solid composition of matter having a pH value of not less than 5.5 and a moisture content of up to at least 30%, said composition consisting essentially of a compound selected from the group consisting of sulphated and phosphated hydrogenated castor oil having an iodine value of not more than 11.

GEORGE W. FIERO.